United States

Betensky

4,145,115

Mar. 20, 1979

[54] ZOOM LENS

[75] Inventor: Ellis I. Betensky, Willowdale, Canada

[73] Assignee: Vivitar Corporation, Santa Monica, Calif.

[21] Appl. No.: 780,257

[22] Filed: Mar. 23, 1977

[51] Int. Cl.² .............................................. G02B 15/18
[52] U.S. Cl. ................................................... 350/184
[58] Field of Search .................. 350/184, 186

[56] References Cited
U.S. PATENT DOCUMENTS

3,533,679  10/1970  Baluteau ........................ 350/184
3,598,476  8/1971  Merigold ........................ 350/186

*Primary Examiner*—Conrad J. Clark
*Attorney, Agent, or Firm*—DeLio and Montgomery

[57] ABSTRACT

A zoom lens having a semi-field angle of between 12.6° and 6.3° capable of focusing at a 1:2 image-to-object distance ratio while providing a comfortable working range. The lens comprises a movable focusing group, a second stationary compensating group, two zooming groups which move axially relative to the lens and differentially of each other, and a fifth rear master group.

12 Claims, 3 Drawing Figures

Fig. 2.

ZOOM LENS

This invention relates to zoom lenses and more particularly to zoom lenses which may be focused to a comfortable working range while providing a small object size to image size ratio.

Conventional zoom lenses for a camera such as the popular single lens reflex camera normally include a front focusing group, a variator group, a compensator group, and a rear master lens group. An example of such a lens, specified as 70 to 210 millimeter zoom for an image frame of 24×36 millimeters, is disclosed in U.S. Pat. No. 3,817,600. This lens is capable of focusing to an object distance of approximately six feet with a magnification of about 1:9 in a normal zooming mode. In a separate macro focusing mode, the lens is capable of obtaining a 1:2.2 magnification at an object distance of approximately four inches.

Macro lenses have been designed to provide magnifications of 1:2 and 1:1 with a flat image field. However, to achieve such a magnification with close focusing the object-to-lens distance is very small.

As an approximate rule of thumb, a macro lens designed for magnification of 1:1 can focus on an object distance as close as two equivalent focal lengths (EFL's) from the optical center of the lens, while if the magnification is lowered to 1:2, the closest focusing distance is three EFL's. This is in accordance with the relationship $D_o = (1 + 1/M)$ EFL, where $D_o$ is the focusing distance as measured from the optical center of the lens, and M is the magnification. It is apparent that this relationship results in a short working distance for a normal macro lens having an EFL of between 50 and 90mm (scaled to an image frame of 24×36 millimeters).

For various laboratory and other precision photographic applications, as well as in general photography, it is desirable to be able to continuously vary the magnification over a continuously variable focusing distance. A lens capable of providing such a benefit, plus the ability to achieve an image distance to object distance ratio of as large as 1:2 with a relatively large working distance (one foot or more) from the lens has not heretofore been acheived in a zoom lens.

The image quality of a lens having a long EFL and a large relative aperture of on the order of F/3.5, is seriously degraded at close focusing distance if a conventional front focusing group is provided. Specifically, excessive coma and spherical aberration are introduced into the image. Additionally, the focusing travel and the position of the entrance pupil must be restricted so as to not require a large diameter front lens group.

The present invention provides a zoom lens which can focus to an object distance of approximately eighteen inches from the lens, while achieving the ratio of image distance to object distance of as high as 1:2, while providing a flat image field.

In a lens embodying the invention, the aforementioned focusing travel and front group diameter problems are overcome by providing a front focusing group having a short EFL, followed by a weak fixed compensating group, two zooming groups and a final fixed master group. The front focusing group has a two doublet form to provide a stable correction characteristic over the entire zooming range, in addition to its focusing characteristics. The fixed compensating group is provided to reduce the change of aberration introduced by the front group as it moves for focusing.

Briefly stated, a lens embodying the invention comprises a first positive group movable axially for focusing, a second low power (usually negative) fixed compensating group, a third variator group, a fourth compensator group, and a fifth master lens fixed in relation to the lens housing. The groups have preferred optical characteristics hereinafter described.

It is an object of this invention to provide a new and improved zoom lens capable of focusing at a comfortable object distance with an image-to-object distance ratio of approximately 1:2.

It is another object of the invention to provide a new and improved zoom lens having the stated characteristics which is relatively compact in size.

It is a further object of the invention to provide a new and improved zoom lens having the stated characteristics which is compatible with conventional mechanical designs.

The features of the invention which are believed to be novel are particularly pointed out and distinctly claimed in the concluding portion of the specification. The invention, however, both as to its operation and organization, together with further objects and advantages thereof may best be appreciated by reference to the following detailed description taken in conjunction with the drawings wherein:

In the design of any lens, the elements, groupings and spacings are chosen to minimize the aberration and distortion of the lens as a whole to provide a true image of the object. The lens groups are chosen to provide a lens of a given field angle or EFL for a specific size and quality. Therefore, the contribution of each lens group or element or spacing therebetween in a multielement lens to distortion or correction thereof or to lengthening or shortening of the EFL is not always capable of precise delineation. All lens configurations represent a balance of factors and are selected in view of the other to provide the desired result.

In the following description, each lens element is identified by L followed by a numeral. Element groups are identified by GP followed by a numeral and the lens surfaces are identified by S followed by a numeral. Enumeration of the elements, groups and surfaces begins at the object side of the lens, and progresses towards the image side.

Figure 1:
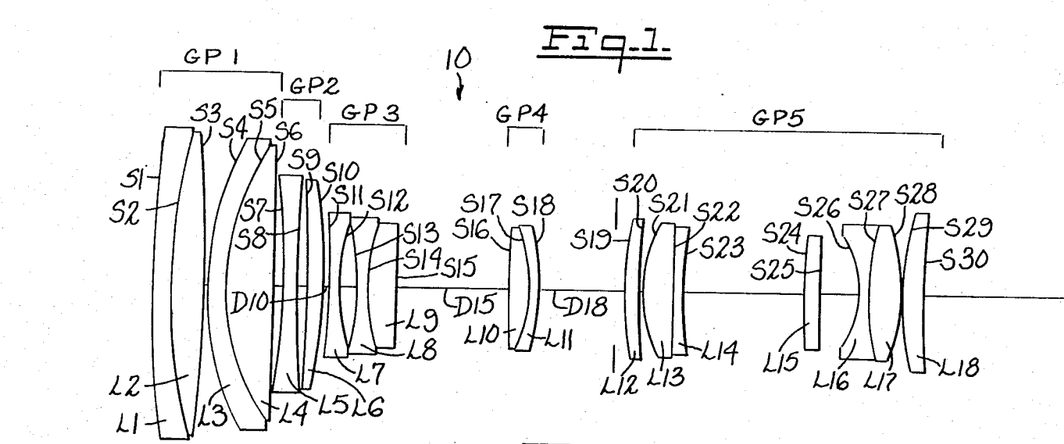
FIG. 1 is a side view of a lens form embodying the invention.

With reference to FIG. 1, the invention provides a zoom lens 10 which subtends a semi-field angle that can be varied between 12.6° and 6.3°.. The lens comprises eighteen elements, L1 – L18, divided into five groups, GP1 – GP5. The groups are generally described as follows:

Group GP1 comprises two doublets of positive power.

Group GP2 comprises at least two elements of low power, usually negative.

Group GP3 has an overall negative power and comprises a singlet and a doublet.

Group GP4 comprises a doublet of positive power.

Group GP5 comprises a fixed positive master rear compensating group.

Groups GP5 may take various forms depending on the type of camera and film format, the EFL range, back focal length (BFL) or the degree of lens compactness required.

In providing the lens forms embodying the invention, it was necessary to include a front focusing arrangement having a minimum aberration change as a function of the focusing. To accomplish this, a fixed correcting group GP2 was provided between the front movable focusing group GP1 and the zooming groups GP3 and GP4. The fixed group GP2 provides a partial aberration compensation which reduces the change in aberration with the focusing travel of group GP1.

The faremost of front focusing group GP1 must itself also have desirable correction characteristics over the entire zooming range. It has been found that desired results can be obtained with a two doublet form.

Two examples are presented of the embodiment shown in FIG. 1. A first example, having data shown in Table I hereinafter, will first be described in detail, and the differences between it and the second example will then be set forth.

In the first example, group GP1 comprises a pair of positive doublets. The first doublet from the object side comprises a negative meniscus L1 having a convex object side, and a positive bi-convex second element L2. The second doublet comprises a negative meniscus L3 also convex toward the object side and a positive convex-concave element L4. The front group GP1 is movable axially for focusing.

Fixed group GP2 comprises from the object side to the image side a bi-concave negative element L5 and a concave-convex positive element L6. Together, elements L5 and L6 form a weak negative group. A weak positive group could also be utilized depending on the overall design of lens 10.

Group GP3 comprises from the object side to the images side a strong negative bi-concave element L7 and a weak negative doublet. The doublet comprises a negative bi-concave element L8 and a positive convex-concave member L9.

Group GP4, the zoom compensator group, comprises a positive doublet of element L10 and L11. Element L10 is bi-convex and element L11 is a negative meniscus having a convex image side.

Group GP5 is a positive fixed master group. The element arrangement of Group GP5 may vary depending on the film format and the camera format. The master group shown in FIG. 1 comprises a seven element group of positive power. As shown, group GP5 comprises a positive convex-concave element L12. Next is a doublet comprising two consecutive convex-concave elements L13 and L14, both having a positive power. Next is a positive element L15, followed by a doublet comprising a bi-concave element L16 and a bi-convex element L17. The final element of the lens shown in FIG. 1 is a positive convex-concave element L18.

Table I sets forth data for the above-described first example of the lens 10 shown in FIG. 1 as scaled to an EFL of substantially 90 to 180 millimeters for a 24×36 millimeter image plane, and having a relative aperture of F/4.65. In Table I, and other tables setting forth lens prescriptions hereinafter, the radii of the individual element surfaces are designated by R followed by the surface number. Radii indicated as being positive are struck from the right and radii indicated as being negative are struck from the left. The Abbe number of each element is designated by $V_d$ and the index refraction is designated by $N_d$.

TABLE I

| Element | Radius of Curvature (mm) | Axial Distance Between Surfaces (mm) | Index of Refraction $N_d$ | Abbe No. $V_d$ |
|---|---|---|---|---|
| L1 | R1 = 224.298 | D1 = 3.500 | 1.805 | 25.5 |
| L2 | R2 = 108.890 | D2 = 7.800 | 1.643 | 47.9 |
|  | R3 = −307.317 | D3 = 0.300 |  |  |
| L3 | R4 = 67.511 | D4 = 3.500 | 1.805 | 25.5 |
| L4 | R5 = 50.481 | D5 = 10.100 | 1.487 | 70.4 |
|  | R6 = 1962.678 | D6 = 2.400 |  |  |
| L5 | R7 = −151.829 | D7 = 3.000 | 1.773 | 49.6 |
|  | R8 = 274.046 | D8 = 1.758 |  |  |
| L6 | R9 = −515.802 | D9 = 4.000 | 1.757 | 36.3 |
|  | R10 = −111.178 | D10 = 1.00 |  |  |
| L7 | R11 = −128.760 | D11 = 2.000 | 1.569 | 63.1 |
|  | R12 = 46.925 | D12 = 3.500 |  |  |
| L8 | R13 = −66.815 | D13 = 2.000 | 1.623 | 58.1 |
| L9 | R14 = 35.262 | D14 = 6.223 | 1.728 | 28.3 |
|  | R15 = 1462.528 | D15 = 23.31 |  |  |
| L10 | R16 = 380.580 | D16 = 4.110 | 1.487 | 70.4 |
| L11 | R17 = −35.6976 | D17 = 2.000 | 1.805 | 25.5 |
|  | R18 = −56.161 | D18 = 15.10 |  |  |
| L12 | R19 = 62.904 | D19 = 3.392 | 1.487 | 70.4 |
|  | R20 = 345.723 | D20 = 0.100 |  |  |
| L13 | R21 = 29.223 | D21 = 6.915 | 1.487 | 70.4 |
| L14 | R22 = 1139.097 | D22 = 1.972 | 1.689 | 31.2 |
|  | R23 = 81.429 | D23 = 25.546 |  |  |
| L15 | R24 = 103.463 | D24 = 3.580 | 1.805 | 25.5 |
|  | R25 = −1071.644 | D25 = 7.757 |  |  |
| L16 | R26 = −22.798 | D26 = 2.080 | 1.834 | 37.3 |
| L17 | R27 = 43.784 | D27 = 7.155 | 1.487 | 70.4 |
|  | R28 = −49.400 | D28 = 0.100 |  |  |
| L18 | R29 = 57.055 | D29 = 4.84 | 1.805 | 25.5 |
|  | R30 = 251.679 |  |  |  |

The aperture determining mechanism is preferably just to the object side of element L12. The BFL of this lens example is 40.9 millimeters. Spacing $D_6$ varies from 2.4 millimeters to 32 millimeters for focusing. Table II shows the spacing D10, D15 and D18 as functions of EFL, for the lens of FIG. 1 and Table I.

TABLE II

|  | SPACINGS (mm) | | |
|---|---|---|---|
| EFL | D10 | D15 | D18 |
| 90 | 1.00 | 23.31 | 15.10 |
| 100.1 | 7.52 | 21.15 | 10.74 |
| 125.2 | 19.63 | 15.08 | 4.70 |
| 135 | 23.05 | 12.45 | 3.90 |
| 145 | 26.24 | 9.77 | 3.39 |
| 155 | 29.05 | 7.02 | 3.30 |
| 165 | 31.55 | 4.21 | 3.60 |
| 175 | 33.78 | 1.34 | 4.22 |

Figure 2:
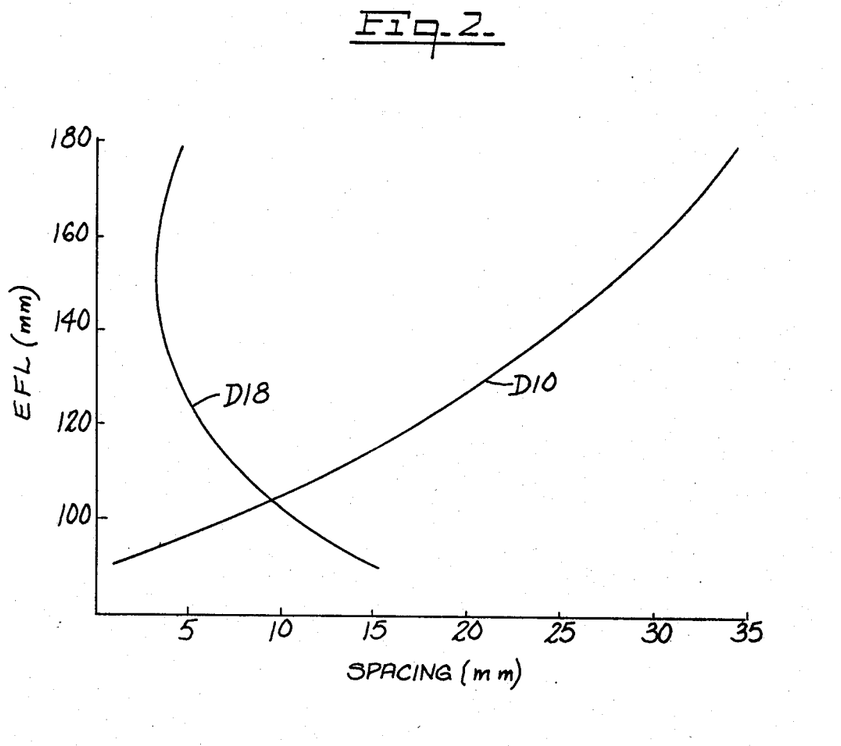
FIG. 2 is a graph showing the variation in spacings between the respective zoom elements and the fixed elements as a function fo EFL.

The variations of spacings D10 and D18 as functions of EFL are shown graphically in FIG. 2. Group GP3 moves rearwardly from surface F10 with increasing EFL, while Group GP4 has a reciprocal motion with respect to surface S19 of Group GP5.

A second example of the lens form shown in FIG. 1 has the following differences from the form of the first example. Element L9 is a bi-convex member. Element L13 is bi-convex, and element L14 is bi-concave. Element L15 is convex-concave, the convex surface being toward the object side. Finally, elements L16 and L17 do not comprise a doublet as the proximate surfaces thereof have slightly differing radii of curvatures.

Table III sets forth data specifying the second example of lens 10 shown in FIG. 1 scaled to an EFL of substantially 90 to 180 millimeters for a 24×36 millimeter image plane an having a relative aperture of F/3.6.

TABLE III

| Element | Radius of Curvature (mm) | Axial Distance Between Surfaces (mm) | Index of Refraction $N_d$ | Abbe No. $V_d$ |
|---|---|---|---|---|
| L1 | R1 = 193.173 | | | |
|    | R2 = 107.852 | D1 = 3.500 | 1.805 | 25.5 |
| L2 | R3 = −422.164 | D2 = 7.800 | 1.643 | 47.9 |
|    | R4 = 71.823 | D3 = 0.300 | | |
| L3 | R5 = 52.616 | D4 = 3.500 | 1.805 | 25.5 |
| L4 | R6 = 3557.617 | D5 = 10.100 | 1.487 | 70.4 |
|    | R7 = −183.735 | D6 = 2.400 | | |
| L5 | R8 = 326.100 | D7 = 3.000 | 1.773 | 49.6 |
|    | R9 = −408.992 | D8 = 2.100 | | |
| L6 | R10 = −125.018 | D9 = 4.000 | 1.757 | 36.3 |
|    | R11 = −158.759 | D10 = 0.447 | | |
| L7 | R12 = 46.015 | D11 = 2.000 | 1.569 | 63.1 |
|    | R13 = −60.810 | D12 = 4.700 | | |
| L8 | R14 = 38.624 | D13 = 2.000 | 1.623 | 58.1 |
| L9 | R15 = −750.885 | D14 = 4.800 | 1.728 | 28.3 |
|    | R16 = 1799.986 | D15 = 23.53 | | |
| L10 | R17 = −37.824 | D16 = 6.500 | 1.487 | 70.4 |
| L11 | R18 = −58.979 | D17 = 2.000 | 1.805 | 25.5 |
|    | R19 = 63.206 | D18 = 14.35 | | |
| L12 | R20 = 1069.561 | D19 = 3.392 | 1.487 | 70.4 |
|    | R21 = 29.700 | D20 = 0.569 | | |
| L13 | R22 = −1988.280 | D21 = 7.453 | 1.487 | 70.4 |
| L14 | R23 = 80.811 | D22 = 1.972 | 1.689 | 31.2 |
|    | R24 = −80.998 | D23 = 25.135 | | |
| L15 | R25 = 395.878 | D24 = 3.580 | 1.805 | 25.5 |
|    | R26 = −23.362 | D25 = 8.443 | | |
| L16 | R27 = 37.378 | D26 = 2.080 | 1.834 | 37.3 |
|    | R28 = 37.246 | D27 = 0.100 | | |
| L17 | R29 = −51.068 | D28 = 7.290 | 1.487 | 70.4 |
|    | R30 = 55.817 | D29 = 0.071 | | |
| L18 | R31 = 364.939 | D30 = 4.840 | 1.805 | 25.5 |

The aperture-determining mechanism is preferably just to the object side of element L12. The BFL of this second example is 39.45 millimeters, and spacing D6 varies from 2.4 millimeters to 34.7 millimeters for focusing.

Table IV shows the spacings D10, D15, and D18 as a function of EFL for the lens of Table III.

TABLE IV

| EFL | SPACINGS (mm) | | |
|---|---|---|---|
|  | D10 | D15 | D18 |
| 90 | .447 | 23.53 | 14.35 |
| 100 | 7.646 | 21.281 | 9.397 |
| 120 | 17.771 | 16.511 | 4.044 |
| 130 | 21.793 | 13.867 | 2.665 |
| 140 | 25.303 | 11.086 | 1.936 |
| 150 | 28.392 | 8.182 | 1.751 |
| 160 | 31.134 | 5.163 | 2.029 |
| 170 | 33.583 | 2.040 | 2.702 |
| 175 | 34.806 | 0.302 | 3.217 |

The foregoing spacings vary graphically in a manner similar to those shown in FIG. 2. Group GP3 moves rearwardly away from surface S10 with increasing EFL. Group GP4 has a reciprocal motion with respect to surface S19 of Group GP5.

Figure 3:
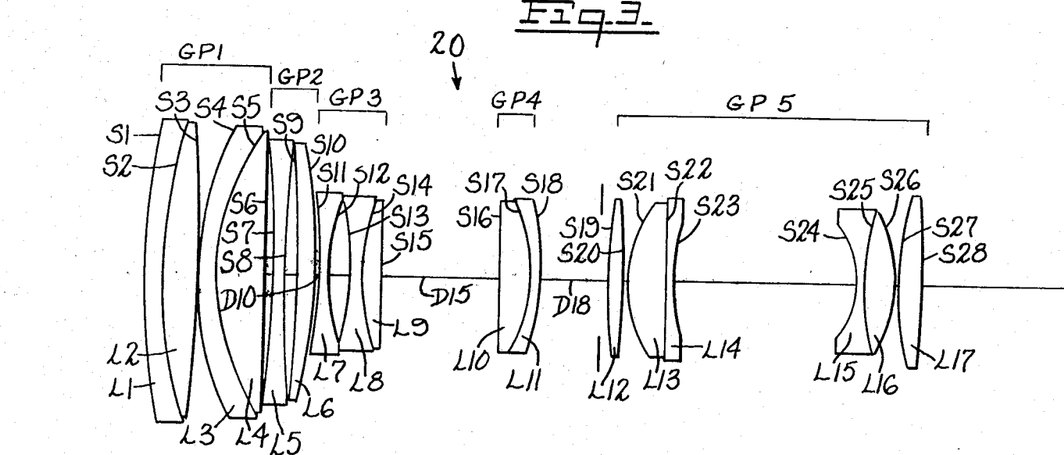
FIG. 3 is a side view of a second embodiment of the invention.

Another form of the invention as shown in FIG. 3 comprises a lens 20, two examples of which are presented herein. A first example will be described in detail and the second example will be described by specifying the differences between it and the first example.

In the first example of the embodiment shown in FIG. 3, lens 20 has seventeen elements L1 – L17, divided into five groups GP1 – GP5 which have similar functions as respective groups of the embodiment shown in FIG. 1. Group GP1 provides a pair of positive doublets, the first doublet from the object side comprising a negative meniscus L1 having a convex object side, and a positive bi-convex second element L2. The second doublet comprises a negative meniscus L3 convex to the object side, and a positive convex-concave element L4. Front Group GP1 is axially movable for focusing.

Fixed Group GP2 comprises from the object side to the image side a bi-concave negative element L5 and a concave-convex positive element L6. Together, elements L5 and L6 form a weak negative group, although a weak positive group may also be utilized depending on the overall design.

Group GP3 comprises from the object side to the image side a strong negative bi-concave element L7, and weak negative doublet. The doublet comprises a negative bi-concave element L8 and the bi-convex element L9.

Group GP4 comprises a doublet of positive power comprising elements L10 and L11. Element L10 is bi-convex and element L11 is a negative meniscus having a convex image side.

Group GP5 is a positive fixed master group. The particular element arrangement of group GP5 may vary depending on the film format and the camera format. The master group shown in FIG. 3 comprises a six element group of positive power. GP5 as shown comprises a positive bi-convex element L12. Next is a doublet comprising two consecutive convex-concave elements L13 and L14 of positive power. Group GP5 further comprises a second doublet, bi-concave element L15 and bi-convex element L16. The final element of group GP5 is bi-convex element L17.

Table V sets forth data specifying the above-described first example of lens 20 as scaled to an EFL of substantially 90 – 180 millimeters for a 24×36 millimeter image plane and having a relative aperture of F/3.6.

TABLE V

| Element | Radius of Curvature (mm) | Axial Distance Between Surfaces (mm) | Index of Refraction $N_d$ | Abbe No. $V_d$ |
|---|---|---|---|---|
| L1 | R1 = 165.484 | D1 = 3.500 | 1.805 | 25.5 |
| L2 | R2 = 96.900 | D2 = 7.800 | 1.643 | 47.9 |
|  | R3 = −463.158 | D3 = 0.300 |  |  |
| L3 | R4 = 74.597 | D4 = 3.500 | 1.805 | 25.5 |
| L4 | R5 = 53.370 | D5 = 10.100 | 1.487 | 70.4 |
|  | R6 = 2690.21 | D6 = 1.700 |  |  |
| L5 | R7 = −207.207 | D7 = 3.000 | 1.773 | 49.6 |
|  | R8 = 323.884 | D8 = 2.100 |  |  |
| L6 | R9 = −375.195 | D9 = 4.000 | 1.757 | 36.3 |
|  | R10 = −132.727 | D10 = 0.50 |  |  |
| L7 | R11 = −153.141 | D11 = 2.000 | 1.569 | 63.1 |
|  | R12 = 46.039 | D12 = 4.700 |  |  |
| L8 | R13 = −60.530 | D13 = 2.000 | 1.623 | 58.1 |
| L9 | R14 = 38.694 | D14 = 4.800 | 1.728 | 28.3 |
|  | R15 = −615.592 | D15 = 24.12 |  |  |
| L10 | R16 = 1842.93 | D16 = 6.500 | 1.487 | 70.4 |
| L11 | R17 = −37.907 | D17 = 2.000 | 1.805 | 25.5 |
|  | R18 = −59.123 | D18 = 13.71 |  |  |
| L12 | R19 = 85.793 | D19 = 3.870 | 1.487 | 70.4 |
|  | R20 = −177.169 | D20 = 0.300 |  |  |
| L13 | R21 = 29.084 | D21 = 8.112 | 1.487 | 70.4 |
| L14 | R22 = 4455.9 | D22 = 2.000 | 1.664 | 35.9 |
|  | R23 = 68.631 | D23 = 37.956 |  |  |
| L15 | R24 = −20.551 | D24 = 1.600 | 1.834 | 37.3 |
| L16 | R25 = 55.025 | D25 = 7.000 | 1.487 | 70.4 |
|  | R26 = −31.595 | D26 = 0.267 |  |  |
| L17 | R27 = 61.494 | D27 = 5.000 | 1.805 | 25.5 |
|  | R28 = −300.169 |  |  |  |

The aperture-determining mechanism is preferably just to the object side of element L12. The BFL of the lens is 38.5 millimeters, and spacing D6 varies from 1.7 millimeters to 34.0 millimeters for focusing.

The spacing D10, D15 and D18 vary to change the EFL of the lens 20. Table VI sets forth data showing the variation in those spacings as a function of the EFL.

TABLE VI

| EFL | SPACINGS (mm) | | |
|---|---|---|---|
|  | D10 | D15 | D18 |
| 89 | .50 | 24.12 | 13.71 |
| 100 | 7.73 | 21.86 | 8.72 |
| 125 | 19.78 | 15.57 | 2.96 |
| 135 | 23.52 | 12.82 | 2.01 |
| 145 | 26.77 | 9.92 | 1.63 |
| 155 | 29.65 | 6.92 | 1.75 |
| 176 | 34.81 | .30 | 3.22 |

The foregoing spacings vary graphically in a manner similar to those shown in FIG. 2. Group GP3 moves rearwardly away from surface S10 with increasing EFL. Group GP4 has a reciprocal motion with respect to surface S19 of Group GP5.

The second example of the lens form shown in FIG. 3 differs from the first example only in that element L4 in the second example is bi-convex rather than being convex-concave.

Table VII sets forth data on the second example of lens 20 scaled to an EFL substantially in the range between 90 and 180 millimeters for a 24×36 millimeter image frame and having a relative aperture of F/3.60.

TABLE VII

| Element | Radius of Curvature (mm) | Axial Distance Between Surfaces (mm) | Index of Refraction $N_d$ | Abbe No. $V_d$ |
|---|---|---|---|---|
| L1 | R1 = 149.310 | D1 = 3.500 | 1.805 | 25.5 |
| L2 | R2 = 107.429 | D2 = 7.300 | 1.639 | 45.1 |
|  | R3 = −2049.682 | D3 = 0.300 |  |  |
| L3 | R4 = 83.806 | D4 = 3.500 | 1.805 | 25.5 |
| L4 | R5 = 56.142 | D5 = 10.500 | 1.487 | 70.4 |
|  | R6 = −1643.263 | D6 = 42.000 |  |  |
| L5 | R7 = −218.640 | D7 = 3.000 | 1.773 | 49.6 |
|  | R8 = 1561.668 | D8 = 2.100 |  |  |
| L6 | R9 = −340.717 | D9 = 4.000 | 1.757 | 36.3 |
|  | R10 = −151.315 | D10 = 0.500 |  |  |
| L7 | R11 = −166.461 | D11 = 2.000 | 1.569 | 63.1 |
|  | R12 = 47.339 | D12 = 4.700 |  |  |
| L8 | R13 = −61.492 | D13 = 2.000 | 1.620 | 60.3 |
| L9 | R14 = 40.353 | D14 = 4.800 | 1.728 | 28.3 |
|  | R15 = −2054.720 | D15 = 25.786 |  |  |
| L10 | R16 = 430.672 | D16 = 6.500 | 1.487 | 70.4 |
| L11 | R17 = −37.183 | D17 = 2.000 | 1.805 | 25.5 |
|  | R18 = −59.066 | D18 = 14.054 |  |  |
| L12 | R19 = 81.384 | D19 = 3.870 | 1.487 | 70.4 |
|  | R20 = −187.530 | D20 = 0.300 |  |  |
| L13 | R21 = 29.707 | D21 = 8.112 | 1.487 | 70.4 |
| L14 | R22 = 304.826 | D22 = 2.000 | 1.664 | 35.9 |
|  | R23 = 58.333 | D23 = 39.309 |  |  |
| L15 | R24 = −20.933 | D24 = 1.600 | 1.834 | 37.3 |
| L16 | R25 = 65.666 | D25 = 7.000 | 1.487 | 70.4 |
|  | R26 = −33.525 | D26 = 0.267 |  |  |
| L17 | R27 = 68.486 | D27 = 4.500 | 1.805 | 25.5 |
|  | R28 = −189.489 |  |  |  |

The aperture determining mechanism is preferably just to the object side of element L12. The BFL of the lens is 38.2 millimeters and spacing D6 varies from 1.7 millimeters to 42 millimeters for focusing.

Spacings D10, D15 and D18 vary to change the EFL of lens 20. Table VIII sets forth the spacings D10, D15 and D18 as functions of EFL, for the lens 20 described in Table VII.

TABLE VIII

| EFL | SPACINGS (mm) | | |
|---|---|---|---|
| | D10 | D15 | D18 |
| 89 | 0.500 | 25.786 | 14.054 |
| 135 | 23.824 | 14.082 | 2.435 |
| 176 | 35.146 | 1.955 | 3.241 |

The foregoing spacings vary in a manner similar to those shown in FIG. 2. Group GP3 moves rearwardly away from surface S10 with increasing EFL while Group GP4 moves reciprocally with respect to surface S19 of Group GP5.

To achieve the desired magnification of 1:2 at a working distance of as short as eighteen inches, a lens of the type described should have a front focusing group having a relatively short EFL as expressed by $1.0 F_L > F_1 > 1.4 F_L$, where $F_1$ is the EFL of Group GP1, and $F_L$ is the low point of the EFL range. Furthermore, the aberration introduced by focusing Group GP1, in conjunction with fixed Group GP2, must be newly contant throughout the focusing travel. The stability is attained, in Group GP1, through the use of two doublets, preferably both having positive power, to share the overall positive contribution of the focusing group. The EFL's of the two doublets comprising Group GP1 are set forth in Table IX.

TABLE IX

| Lens | L1, L2 | L3, L4 |
|---|---|---|
| Table I | 239.5mm | 180.4mm |
| Table III | 218.7 | 206.5 |
| Table V | 239.3 | 193.4 |
| Table VII | 241.7 | 231.2 |

The EFL's of the doublets comprising Group GP1 do not differ from each other by more than 35%.

The stationary group GP2 should be of relatively weak optical power, as expressed by $$|F_2| > 2F_u$$

where $F_2$ is the EFL of stationary Group GP2 and $F_u$ is the upper limit of the EFL range of the lens.

The relative powers of zooming groups GP3 and GP4 vary with overall lens form and movement, but with the movements disclosed they should have the following relationships:

$$0.6 F_L > F_3 > 0.4 F_L$$

and $$1.0 F_u > F_4 > 1.5 F_L$$

where $F_3$ and $F_4$ are the EFL's of Groups GP3 and GP4, respectively, $F_L$ is the lower limit of the EFL range, and Fu is the upper limit of the EFL range.

Table X sets forth the EFL's of the Groups GP1 - GP5 for the disclosed examples.

The above-described lens examples embodying the invention are capable of focusing to as short as eighteen inches with a magnification of 1:2 at the upper limit of the EFL range. At the lower EFL, the magnification at the same distance is 1:4. These relatively large magnifications with a comfortable working distance are achieved with a very flat image field.

It may thus be seen that the objects of the invention set forth above as well as those made apparent have been efficiently attained.

While preferred embodiments of the invention are set forth for purposes of disclosure, other embodiments and modifications of the disclosed embodiments of the invention may be derived by those skilled in the art. Accordingly, the appended claims are intended to cover all embodiments and applications of the invention which do not depart from the spirit and scope thereof.

What is claimed is:

1. A zoom lens comprising from the object end a foremost positive focusing group consisting of two doublets of positive power movable axially of said lens, and further comprising in succession a stationary group of weak optical power a variator group and a compensator group both movable axially of the lens at different rates to vary the equivalent focal length thereof, and a stationary master lens.

2. A zoom lens as defined in claim 1 wherein the focusing group has an equivalent focal length in the range between 1.0 and 1.4 times the lower limit of the equivalent focal length range of said lens.

3. A zoom lens as defined in claim 1 wherein the doublets comprising said front focusing group have equivalent focal lengths which differ from each other by no more than thirty-five percent.

4. A zoom lens as defined in claim 3 wherein the object side doublet of said focusing group has a larger equivalent focal length than does the image side doublet.

5. A zoom lens as defined in claim 1 wherein the weak stationary group has an equivalent focal length with an absolute value greater than twice the upper limit of the equivalent focal length range of said lens.

6. A zoom lens as defined in claim 1 wherein the variator group has an equivalent focal length in the range between four-tenths and six-tenths of the lower limit of the equivalent focal length range of said lens.

7. A zoom lens as defined in claim 1 wherein the compensator group has an equivalent focal length in the range between 1.5 times the lower limit of the equivalent focal length of said lens and the upper limit of the equivalent focal length range of said lens.

8. A lens as defined in claim 1 wherein said lens subtends a semi-field angle which is variable between 6.3 degrees and 12.6 degrees.

9. The zoom lens of claim 1 defined substantially by the following data as scaled to an EFL which varies from substantially 90mm to substantially 180mm, for a 24×36 mm image frame and a BFL of 40.9mm:

| Element | Radius of Curvature (mm) | | Axial Distance Between Surfaces (mm) | | Index of Refraction $N_d$ | Abbe No. $V_d$ |
|---|---|---|---|---|---|---|
| L1 | R1 = | 224.298 | D1 = | 3.500 | 1.805 | 25.5 |
| L2 | R2 = | 108.890 | D2 = | 7.800 | 1.643 | 47.9 |
| | R3 = | −307.317 | D3 = | 0.300 | | |
| L3 | R4 = | 67.511 | D4 = | 3.500 | 1.805 | 25.5 |
| L4 | R5 = | 50.481 | D5 = | 10.100 | 1.487 | 70.4 |
| | R6 = | 1962.678 | D6 = | 2.400 | | |
| L5 | R7 = | −151.829 | D7 = | 3.000 | 1.773 | 49.6 |
| | R8 = | 274.046 | D8 = | 1.758 | | |

-continued

| Element | Radius of Curvature (mm) | | Axial Distance Between Surfaces (mm) | Index of Refraction $N_d$ | Abbe No. $V_d$ |
|---|---|---|---|---|---|
| L6 | R9 = | −515.802 | D9 = 4.000 | 1.757 | 36.3 |
| | R10 = | −111.178 | D10 = 1.00 | | |
| L7 | R11 = | −128.760 | D11 = 2.000 | 1.569 | 63.1 |
| | R12 = | 46.925 | D12 = 3.500 | | |
| L8 | R13 = | −66.815 | D13 = 2.000 | 1.623 | 58.1 |
| | R14 = | 35.262 | | | |
| L9 | | | D14 = 6.223 | 1.728 | 28.3 |
| | R15 = | 1462.528 | D15 = 23.31 | | |
| L10 | R16 = | 380.580 | D16 = 4.110 | 1.487 | 70.4 |
| | R17 = | −35.6976 | | | |
| L11 | | | D17 = 2.000 | 1.805 | 25.5 |
| | R18 = | −56.161 | D18 = 15.10 | | |
| L12 | R19 = | 62.904 | D19 = 3.392 | 1.487 | 70.4 |
| | R20 = | 345.723 | D20 = 0.100 | | |
| L13 | R21 = | 29.223 | D21 = 6.915 | 1.487 | 70.4 |
| | R22 = | 1139.097 | | | |
| L14 | | | D22 = 1.972 | 1.689 | 31.2 |
| | R23 = | 81.429 | D23 = 25.546 | | |
| L15 | R24 = | 103.463 | D24 = 3.580 | 1.805 | 25.5 |
| | R25 = | −1071.644 | D25 = 7.757 | | |
| L16 | R26 = | −22.798 | D26 = 2.080 | 1.834 | 37.3 |
| | R27 = | 43.784 | | | |
| L17 | | | D27 = 7.155 | 1.487 | 70.4 |
| | R28 = | −49.400 | D28 = 0.100 | | |
| L18 | R29 = | 57.055 | D29 = 4.84 | 1.805 | 25.5 |
| | R30 = | 251.679 | | | |

Where L1-L18 are successive lens elements arranged in five groups as follows: L1,L2,L3,L4; L5,L6; L7,L8,L9; L10,L11; L12,L13,L14,L15,L16,L17,L18; R1-R30 are the radii of curvature of the successive lens surfaces according to the sequence of surfaces of the lens system, said lens further having an aperture stop situated between said elements L11 and L12 and wherein said space D6 varies for focusing and spaces D10, D15 and D18 vary for zooming.

10. The zoom lens of claim 1 defined substantially by the following data, as scaled to a EFL which varies from substantially 90mm to substantially 180mm for a 24×36mm image frame and having a BFL of 39.45mm:

-continued

| Element | Radius of Curvature (mm) | | Axial Distance Between Surfaces (mm) | Index of Refraction $N_d$ | Abbe No. $V_d$ |
|---|---|---|---|---|---|
| | | | D8 = 2.100 | | |
| L6 | R9 = | −408.992 | D9 = 4.000 | 1.757 | 36.3 |
| | R10 = | −125.018 | D10 = 0.447 | | |
| L7 | R11 = | −158.759 | D11 = 2.000 | 1.569 | 63.1 |
| | R12 = | 46.015 | D12 = 4.700 | | |
| L8 | R13 = | −60.810 | D13 = 2.000 | 1.623 | 58.1 |
| | R14 = | 38.624 | | | |
| L9 | | | D14 = 4.800 | 1.728 | 28.3 |
| | R15 = | −750.885 | D15 = 23.53 | | |
| L10 | R16 = | 1799.986 | D16 = 6.500 | 1.487 | 70.4 |
| | R17 = | −37.824 | | | |
| L11 | | | D17 = 2.000 | 1.805 | 25.5 |
| | R18 = | −58.979 | D18 = 14.35 | | |
| L12 | R19 = | 63.206 | D19 = 3.392 | 1.487 | 70.4 |
| | R20 = | 1069.561 | D20 = 0.569 | | |
| L13 | R21 = | 29.700 | D21 = 7.453 | 1.487 | 70.4 |
| | R22 = | −1988.280 | | | |
| L14 | | | D22 = 1.972 | 1.689 | 31.2 |
| | R23 = | 80.811 | D23 = 25.135 | | |
| L15 | R24 = | 80.998 | D24 = 3.580 | 1.805 | 25.5 |
| | R25 = | 395.878 | D25 = 8.443 | | |
| L16 | R26 = | −23.362 | D26 = 2.080 | 1.834 | 37.3 |
| | R27 = | 37.378 | D27 = 0.100 | | |
| | R28 = | 37.246 | | | |
| L17 | R29 = | −51.068 | D28 = 7.290 | 1.487 | 70.4 |
| | R30 = | 55.817 | D29 = 0.071 | | |
| L18 | | | D30 = 4.840 | 1.805 | 25.5 |
| | R31 = | 364.939 | | | |

Where L1-L18 are successive lens elements arranged in five groups as follows: L1,L2,L3,L4; L5,L6; L7,L8,L9; L10,L11; L12,L13,L14,L15,L16,L17,L18; R1-R31 are the radii of curvature of the successive lens surfaces according to the sequence of surfaces of the lens system, said lens further having an aperture stop between L11 and L12, and wherein said space D6 varies for focusing and spaces D10, D15 and D18 vary for zooming.

11. The zoom lens of claim 1 defined substantially by the following data, as scaled to an EFL which varies from substantially 90mm to substantially 180mm for a 24×36mm image frame and having a BFL of 38.5mm:

| Element | Radius of Curvature (mm) | | Axial Distance Between Surfaces (mm) | Index of Refraction $N_d$ | Abbe No. $V_d$ |
|---|---|---|---|---|---|
| L1 | R1 = | 193.173 | D1 = 3.500 | 1.805 | 25.5 |
| | R2 = | 107.852 | | | |
| L2 | | | D2 = 7.800 | 1.643 | 47.9 |
| | R3 = | −422.164 | D3 = 0.300 | | |
| L3 | R4 = | 71.823 | D4 = 3.500 | 1.805 | 25.5 |
| | R5 = | 52.616 | | | |
| L4 | | | D5 = 10.100 | 1.487 | 70.4 |
| | R6 = | 3557.617 | D6 = 2.400 | | |
| L5 | R7 = | −183.735 | D7 = 3.000 | 1.773 | 49.6 |
| | R8 = | 326.100 | | | |

| Element | Radius of Curvature (mm) | | Axial Distance Between Surfaces (mm) | Index of Refraction $N_d$ | Abbe No. $V_d$ |
|---|---|---|---|---|---|
| L1 | R1 = | 165.484 | D1 = 3.500 | 1.805 | 25.5 |
| | R2 = | 96.900 | | | |
| L2 | | | D2 = 7.800 | 1.643 | 47.9 |
| | R3 = | −463.158 | D3 = 0.300 | | |
| L3 | R4 = | 74.597 | D4 = 3.500 | 1.805 | 25.5 |
| | R5 = | 53.370 | | | |
| L4 | | | D5 = 10.100 | 1.487 | 70.4 |
| | R6 = | 2690.21 | D6 = 1.700 | | |
| L5 | R7 = | −207.207 | D7 = 3.000 | 1.773 | 49.6 |
| | R8 = | 323.884 | | | |

-continued

| Element | Radius of Curvature (mm) | | Axial Distance Between Surfaces (mm) | | Index of Refraction $N_d$ | Abbe No. $V_d$ |
|---|---|---|---|---|---|---|
| | | | D8 = | 2.100 | | |
| L6 | R9 = | −375.195 | D9 = | 4.000 | 1.757 | 36.3 |
| | R10 = | −132.727 | D10 = | 0.50 | | |
| L7 | R11 = | −153.141 | D11 = | 2.000 | 1.569 | 63.1 |
| | R12 = | 46.039 | D12 = | 4.700 | | |
| L8 | R13 = | −60.530 | D13 = | 2.000 | 1.623 | 58.1 |
| | R14 = | 38.694 | | | | |
| L9 | R15 = | −615.592 | D14 = | 4.800 | 1.728 | 28.3 |
| | | | D15 = | 24.12 | | |
| L10 | R16 = | 1842.93 | D16 = | 6.500 | 1.487 | 70.4 |
| | R17 = | −37.907 | | | | |
| L11 | R18 = | −59.123 | D17 = | 2.000 | 1.805 | 25.5 |
| | | | D18 = | 13.71 | | |
| L12 | R19 = | 85.793 | D19 = | 3.870 | 1.487 | 70.4 |
| | R20 = | −177.169 | D20 = | 0.300 | | |
| L13 | R21 = | 29.084 | D21 = | 8.112 | 1.487 | 70.4 |
| | R22 = | 4455.9 | | | | |
| L14 | R23 = | 68.631 | D22 = | 2.000 | 1.664 | 35.9 |
| | | | D23 = | 37.956 | | |
| L15 | R24 = | −20.551 | D24 = | 1.600 | 1.834 | 37.3 |
| | R25 = | 55.025 | | | | |
| L16 | R26 = | −31.595 | D25 = | 7.000 | 1.487 | 70.4 |
| | | | D26 = | 0.267 | | |
| L17 | R27 = | 61.494 | D27 = | 5.000 | 1.805 | 25.5 |
| | R28 | −300.169 | | | | |

Where L1-L17 are successive lens elements arranged in five groups as follows: L1,L2,L3,L4; L5,L6; L7,L8,L9; L10,L11; L12,L13,L14,L15,L16,L17; R1-R28 are the radii of curvature of the successive lens surfaces according to the sequence of surfaces of the lens system, said lens further having an aperture stop between L11 and L12, and wherein said space D6 varies for focusing and spaces D10, D15 and D18 vary for zooming.

12. The zoom lens of claim 1 defined substantially by the following data, as scaled to an EFL which varies from substantially 90mm to substantially 180mm for a 24×36mm image frame and having a BFL of 38.2:

TABLE VII

| Element | Radius Curvature (mm) | | Axial Distance Between Surfaces (mm) | | Index of Refraction $N_d$ | Abbe No. $V_d$ |
|---|---|---|---|---|---|---|
| L1 | R1 = | 149.310 | D1 = | 3.500 | 1.805 | 25.5 |
| | R2 = | 107.429 | | | | |
| L2 | R3 = | −2049.682 | D2 = | 7.300 | 1.639 | 45.1 |
| | | | D3 = | 0.300 | | |
| L3 | R4 = | 83.806 | D4 = | 3.500 | 1.805 | 25.5 |
| | R5 = | 56.142 | | | | |
| L4 | R6 = | −1643.263 | D5 = | 10.500 | 1.487 | 70.4 |
| | | | D6 = | 42.000 | | |
| L5 | R7 = | −218.640 | D7 = | 3.000 | 1.773 | 49.6 |
| | R8 = | 1561.668 | | | | |
| | | | D8 = | 2.100 | | |
| L6 | R9 = | −340.717 | D9 = | 4.000 | 1.757 | 36.3 |
| | R10 = | −151.315 | D10 = | 0.500 | | |
| L7 | R11 = | −166.461 | D11 = | 2.000 | 1.569 | 63.1 |
| | R12 = | 47.339 | D12 = | 4.700 | | |
| L8 | R13 = | −61.492 | D13 = | 2.000 | 1.620 | 60.3 |
| | R14 = | 40.353 | | | | |
| L9 | R15 = | −2054.720 | D14 = | 4.800 | 1.728 | 28.3 |
| | | | D15 = | 25.786 | | |
| L10 | R16 = | 430.672 | D16 = | 6.500 | 1.487 | 70.4 |
| | R17 = | −37.183 | | | | |
| L11 | R18 = | −59.066 | D17 = | 2.000 | 1.805 | 25.5 |
| | | | D18 = | 14.054 | | |
| L12 | R19 = | 81.384 | D19 = | 3.870 | 1.487 | 70.4 |
| | R20 = | −187.530 | D20 = | 0.300 | | |
| L13 | R21 = | 29.707 | D21 = | 8.112 | 1.487 | 70.4 |
| | R22 = | 304.826 | | | | |
| L14 | R23 = | 58.333 | D22 = | 2.000 | 1.664 | 35.9 |
| | | | D23 = | 39.309 | | |
| L15 | R24 = | −20.933 | D24 = | 1.600 | 1.834 | 37.3 |
| | R25 = | 65.666 | | | | |
| L16 | R26 = | −33.525 | D25 = | 7.000 | 1.487 | 70.4 |
| | | | D26 = | 0.267 | | |
| L17 | R27 = | 68.486 | D27 = | 4.500 | 1.805 | 25.5 |
| | R28 = | −189.489 | | | | |

Where L1-L17 are successive lens elements arranged in five groups as follows; L1,L2,L3,L4; L5,L6; L7,L8,L9; L10,L11; L12,L13,L14,L15,L16,L17; R1-R28 are the radii of curvature of the successive lens surfaces according to the sequence of surfaces of the lens system, said lens further having an aperture stop between L11 and L12 and wherein said space D6 varies for focusing and spaces D10, D15 and D18 vary for zooming.

* * * * *

UNITED STATES PATENT AND TRADEMARK OFFICE
CERTIFICATE OF CORRECTION

PATENT NO. : 4,145,115
DATED : March 20, 1979
INVENTOR(S) : ELLIS I. BETENSKY

It is certified that error appears in the above-identified patent and that said Letters Patent are hereby corrected as shown below:

Column 1, line 44, change "acheived" to --achieved--.

Column 2, line 45, change "other" to --others--.

Column 3, line 14, change "faremost of" to --foremost or--.

Column 3, line 38, change "images" to --image--.

Column 9, lines 17 and 18, change "$1.0\ F_L > F_1 > 1.4\ F_L$" to --$1.0\ F_L < F_1 < 1.4\ F_L$--.

Column 9, line 21, change "newly contant" to --nearly constant--.

Column 10, line 5 of claim 1, insert a comma after "power".

Column 10, line 2 of claim 3, after "said", delete "front".

Column 11, line 2 of claim 10, change "a EFL" to --an EFL--.

UNITED STATES PATENT AND TRADEMARK OFFICE
CERTIFICATE OF CORRECTION

PATENT NO. : 4,145,115
DATED : March 20, 1979
INVENTOR(S) : ELLIS I. BETENSKY

It is certified that error appears in the above-identified patent and that said Letters Patent are hereby corrected as shown below:

Column 9, before line 61, insert the following:

TABLE X

EFL (in mm) BY GROUPS

| LENS EXAMPLE | GP1 | GP2  | GP3 | GP4 | GP5 |
|---|---|---|---|---|---|
| Table I   | 103 | -430 | -42 | 147 | 80 |
| Table III | 107 | -457 | -43 | 178 | 75 |
| Table V   | 106 | -440 | -44 | 179 | 80 |
| Table VII | 119 | -878 | -44 | 159 | 86 |

Signed and Sealed this

Nineteenth Day of June 1979

[SEAL]

Attest:

RUTH C. MASON
Attesting Officer

DONALD W. BANNER
Commissioner of Patents and Trademarks